(12) United States Patent
Ryu

(10) Patent No.: US 7,900,988 B2
(45) Date of Patent: Mar. 8, 2011

(54) DASHBOARD HAVING RECEIVING STRUCTURE FOR PORTABLE TERMINAL

(76) Inventor: Hee-Suk Ryu, Seoul (KR)

( * ) Notice: Subject to any disclaimer, the term of this patent is extended or adjusted under 35 U.S.C. 154(b) by 305 days.

(21) Appl. No.: 12/077,125

(22) Filed: Mar. 17, 2008

(65) Prior Publication Data

US 2008/0284198 A1  Nov. 20, 2008

(30) Foreign Application Priority Data

Mar. 20, 2007 (KR) ........................ 10-2007-0027176

(51) Int. Cl.
*B60R 11/00* (2006.01)
(52) U.S. Cl. ...................... 296/37.12; 224/483; 348/837; 455/345
(58) Field of Classification Search ............... 296/24.34, 296/37.8, 37.12, 1.07; 224/483; 348/832; 455/345

See application file for complete search history.

(56) References Cited

U.S. PATENT DOCUMENTS

| | | | | |
|---|---|---|---|---|
| 3,071,728 A * | 1/1963 | Grace et al. | .................... | 455/346 |
| 5,836,496 A * | 11/1998 | Levin et al. | .................... | 224/553 |
| 6,957,755 B2 * | 10/2005 | Mahoney et al. | .............. | 224/413 |
| 7,084,932 B1 * | 8/2006 | Mathias et al. | ................ | 348/837 |
| 7,413,229 B2 * | 8/2008 | Kukucka et al. | ............ | 296/24.34 |
| 7,469,951 B2 * | 12/2008 | Welschholz et al. | .......... | 296/37.8 |
| 7,623,958 B1 * | 11/2009 | Laverick et al. | .............. | 701/200 |
| 7,648,114 B2 * | 1/2010 | Åkerstedt et al. | ................ | 248/313 |
| 7,708,328 B2 * | 5/2010 | Doom et al. | ............... | 296/37.12 |
| 2005/0018392 A1 * | 1/2005 | Strohmeier et al. | ........... | 361/683 |
| 2009/0096240 A1 * | 4/2009 | Hanzel | ......................... | 296/37.8 |
| 2009/0134649 A1 * | 5/2009 | Boreanaz et al. | .......... | 296/24.34 |
| 2009/0152418 A1 * | 6/2009 | Bury | .......................... | 248/205.3 |

FOREIGN PATENT DOCUMENTS

WO  WO-2007/096143 A1 *  8/2007

* cited by examiner

*Primary Examiner* — Jason S Morrow
(74) *Attorney, Agent, or Firm* — Ladas & Parry LLP

(57) ABSTRACT

A dashboard having a receiving structure for a portable terminal is provided, which comprises a space part which has an opening at its one side and where a portable terminal is mounted; and a support part which is provided in the interior of the space part and supports the terminal for preventing the movements of the terminal. And a dashboard having a receiving structure for a portable terminal is provided, which further comprises a cover which opens and closes the opening.

19 Claims, 12 Drawing Sheets

DASHBOARD HAVING RECEIVING STRUCTURE FOR PORTABLE TERMINAL

TECHNICAL FIELD

The present invention relates to a vehicle dashboard, and in particular to a vehicle dashboard having a receiving structure for a portable terminal which is equipped with a navigation function, a 3D image playback function and a music playback function.

BACKGROUND ART

Generally, a vehicle is equipped with a navigation device which is able to receive signals from a plurality of satellites belonging to a GPS (Global Positioning System) for checking the current position, a moving speed, etc. or for determining a moving path, and which computes the position of a corresponding vehicle by using latitude, longitude, altitude, etc. After the above operations, a certain map data including the current position is provided to a driver. Along with its useful functions such as the current position and speed of a user and a moving path to a destination, the users of the navigation device increase day by day.

The vehicle is shipped with a navigation device generally equipped in a dashboard. Here, a relatively luxury and expensive vehicle model is inherently equipped with a navigation device. An ordinary model of a vehicle is not generally equipped with an expensive navigation device due to its higher price. In case of a built-in navigation device, the user is not able to select a desired device among various navigation devices. When it is needed to change with a new device, the navigation device installed in a previous vehicle cannot be removed and moved to a new vehicle. So, a lot of the information stored in the previous vehicle may be lost, so the user should repurchase a new navigation device and should learn the manual again concerning the new navigation device, and should input again a lot of data, which lead to many inconveniences and a lot of workload.

So, some drivers intend to separately purchase and install a certain portable terminal comprehensively having the multimedia functions such as a relatively lower price vehicle navigation device, a 3D image playback function, a music playback function, etc. Since the vehicle shipped with no navigation device is initially not provided with a certain space for installing a navigation device in the interior of a vehicle, the installation of the same is not easy, so the installed navigation device may be seen from the outside through windows, which leads to a higher robbery possibility. In order to overcome the above problems, when a user repeats an engagement and a disengagement of the device, a fixing structure of a portable terminal may be hurt.

When a portable terminal is installed in the dashboard along with many electric lines connected to the terminal or when the portable terminal is not used and so only a holder structure used for supporting the navigation device is left alone, an outer appearance looks bad due to the electric lines or the holder structure left alone.

In case of a vacuum absorption type which is widely used for engaging a navigation device on an inner surface of a windshield of a vehicle, the vacuum absorption navigation device and its holder structure are not stored in the dashboard, so that a driver's forward vision may be interfered, and when the temperature decreases in winter, an adhering force may be significantly decreased.

DISCLOSURE OF THE INVENTION

Accordingly, it is an object of the present invention to provide a dashboard having a receiving structure for a portable terminal which overcomes the problems encountered in a conventional dashboard of a vehicle.

It is another object of the present invention to provide a dashboard having a receiving structure for a portable terminal in a vehicle dashboard which includes a space part for mounting a portable terminal, and a support part for supporting a terminal for preventing the movements of the terminal.

To achieve the above objects, in a vehicle dashboard, there is provided a dashboard having a receiving structure for a portable terminal which comprises a space part which has an opening at its one side and where a portable terminal is mounted; and a support part which is provided in the interior of the space part and supports the terminal for preventing the movements of the terminal.

According to one aspect of the present invention, the support part comprises first and second side support parts for supporting the front and side surfaces of both sides of the terminal, respectively, and the bottom plate of the space part including portions for mounting the lower side of the portable terminal and the first and second side support parts slides backward, and the backside of the portable terminal is supported by the dashboard or the space part.

According to one aspect of the present invention, the support part comprises first and second side support parts for supporting the front and side surfaces of both sides of the terminal, and a backside support part for supporting the backside of the terminal, and the bottom plate of the space including portions for mounting the lower side of the portable terminal and the first and second side support parts slides backward, and the backside of the portable terminal is supported by means of the backside support part.

To achieve the above objects, in a vehicle dashboard, there is provided a dashboard having a receiving structure for a portable terminal which comprises a space part which has an opening at its one side and where a portable terminal is mounted; a support part which is provided in the interior of the space part and supports the terminal for preventing the movements of the terminal; and a cover which opens and closes the opening.

According one aspect of the present invention, the support part includes first and second side support parts which support a font side and a side surface of both sides of the terminal, respectively.

According to one aspect of the present invention, the support part further includes a backside support part for supporting the backside.

According to one aspect of the present invention, the bottom plate of the space part, which includes portions for mounting the lower side of the portable terminal and the first and second side support parts, slides backward, and the backside of the portable terminal is supported by means of the dashboard or the wall body of the space part.

According to one aspect of the present invention, the bottom plate of the space part, which includes portions for mounting the lower side of the portable terminal and the first and second side support parts, slides backward, and the backside of the portable terminal is supported by means of the backside support part.

Accordingly to one aspect of the present invention, the terminal support portions of the side support parts are movable up and down.

According to one aspect of the present invention, there are further provided slide bars which are formed at both sides of the space part, respectively, a base plate which has slide grooves formed at both sides for receiving the slide bars, respectively, therein, and a tooth shaped rotation groove formed at an upper surface, and a rotation plate in which a rotation part corresponding to the rotation groove is extended from a lower surface in a downward direction for mounting the lower side of the portable terminal thereon.

According to one aspect of the present invention, the first and second side support parts are movable left and right in a widthwise direction of the terminal along a transverse direction guide groove formed on the bottom which mounts the portable terminal thereon.

According to one aspect of the present invention, a transverse direction guide rail having a prominence and depression structure on its upper side is inserted into the horizontal direction guide groove.

According to one aspect of the present invention, the backside support part is movable left and right in a thickness direction of the terminal along the a lengthwise guide groove formed on the bottom which mounts the portable terminal thereon.

According to one aspect of the present invention, a lengthwise guide rail having a prominence and depression structure on its upper side is inserted into the lengthwise guide groove.

According to one aspect of the present invention, the backside support part has a hinge connection structure in its intermediate portion and is folded and stored when it is not used.

According to one aspect of the present invention, a horizontal direction groove and a horizontal guide rail having a prominence and depression structure surface are formed on an outer side surface of each first and second side support parts, and a backside support part is integrally engaged in the horizontal direction groove for a width adjustment with respect to each side support part.

According to one aspect of the present invention, a connection terminal connected with the power supply jack of the terminal is provided on one side of the space part.

According to one aspect of the present invention, an electric line receiving groove is formed on one side of the space part for an electric line arrangement of the terminal.

According to one aspect of the present invention, the cover part is formed in a slide door type for opening and closing the opening part in such a manner that one side of the space part is slid to the opposite side.

According to one aspect of the present invention, the cover part is formed of a plurality of hinge-connected boards which are connected at regular intervals.

BRIEF DESCRIPTION OF THE DRAWINGS

The present invention will become better understood with reference to the accompanying drawings which are given only by way of illustration and thus are not limitative of the present invention, wherein.

MODES FOR CARRYING OUT THE INVENTION

Figure 1:
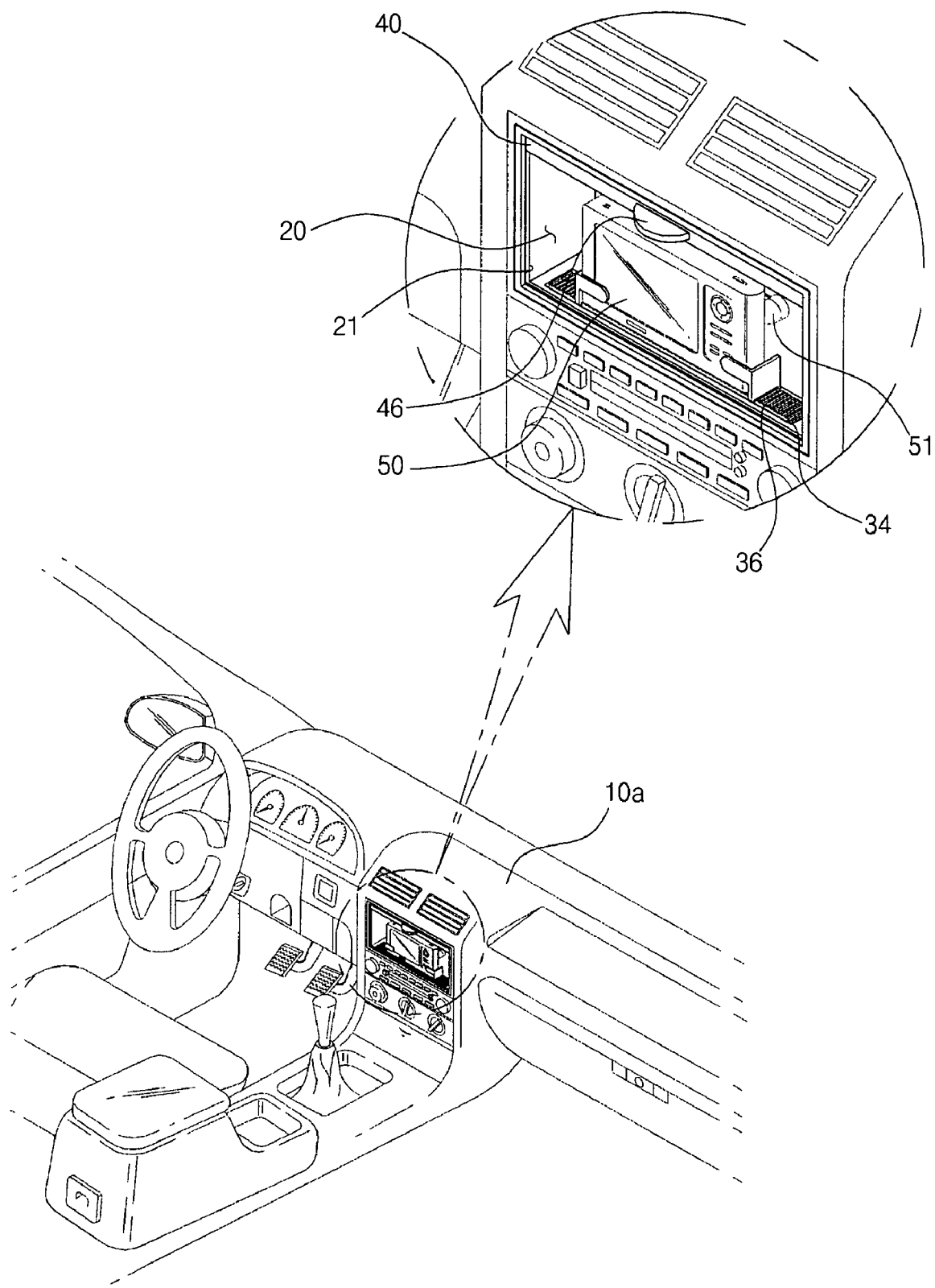
FIG. 1 is a perspective view illustrating a dashboard for mounting a portable terminal on its front side according to an embodiment of the present invention.
Figure 2:
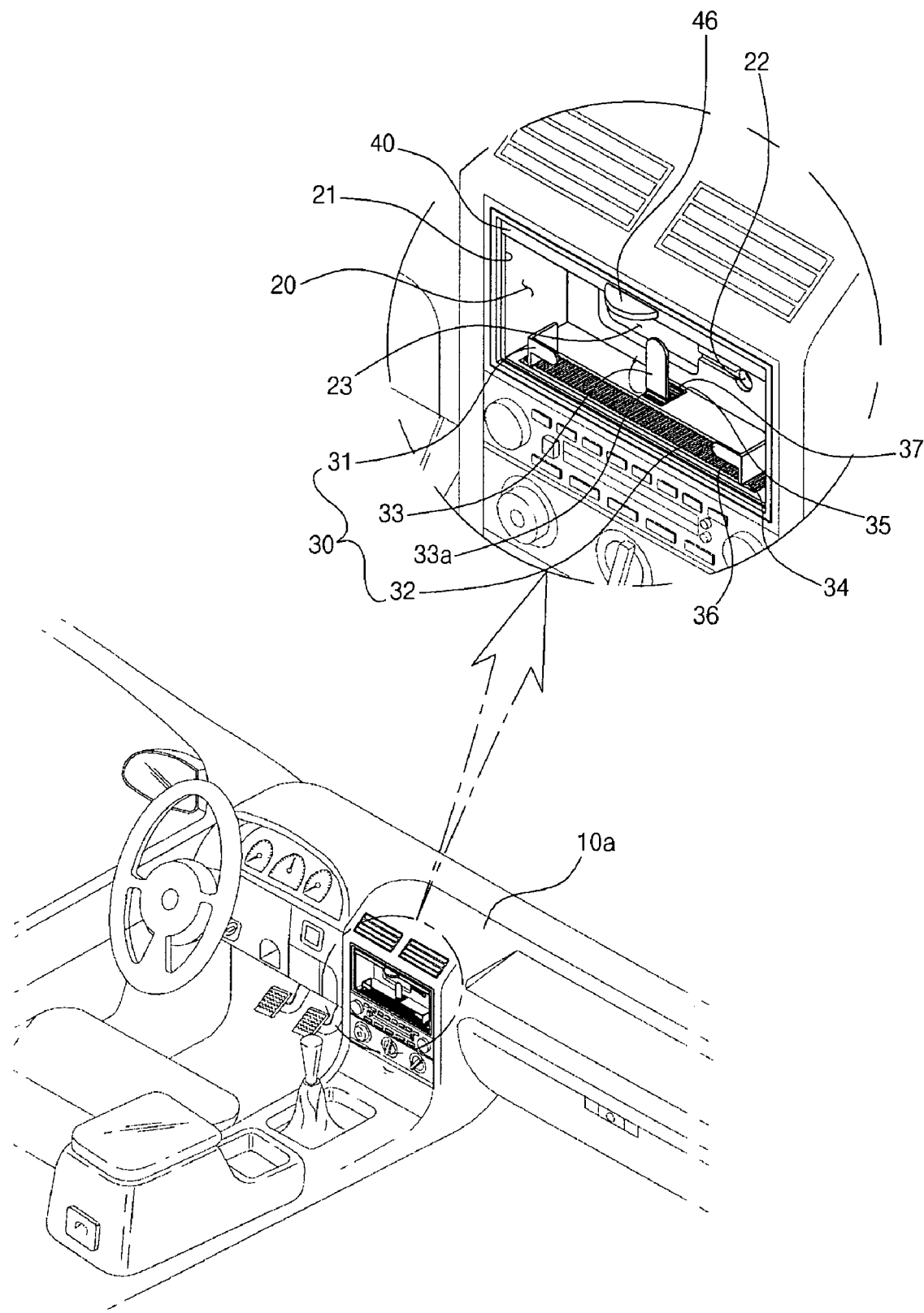
FIG. 2 is a view illustrating a state before a portable terminal is mounted on a dashboard of FIG. 1.
Figure 3:
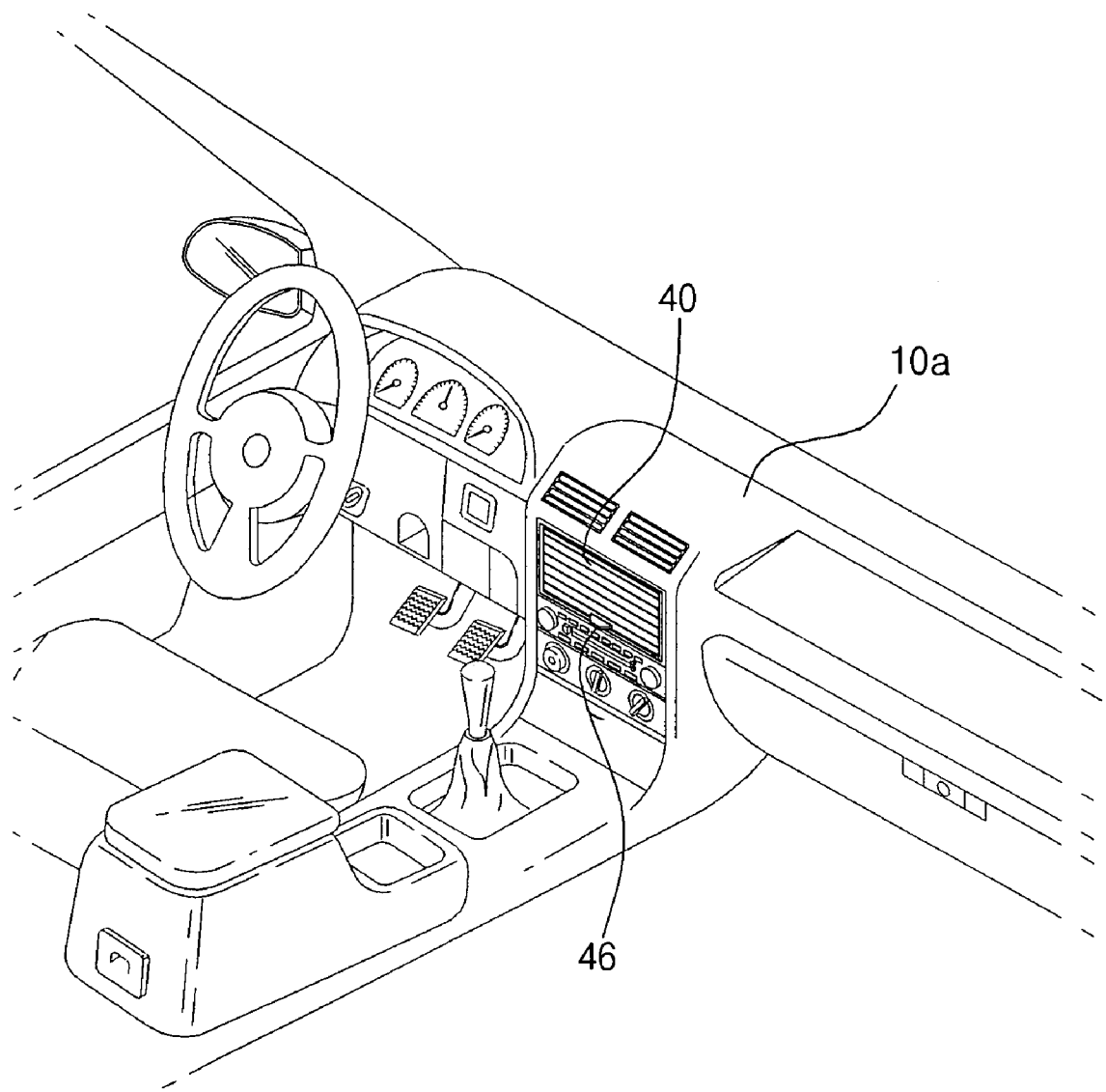
FIG. 3 is a view illustrating a state after a portable terminal is used in a dashboard of FIG. 1.
Figure 4:
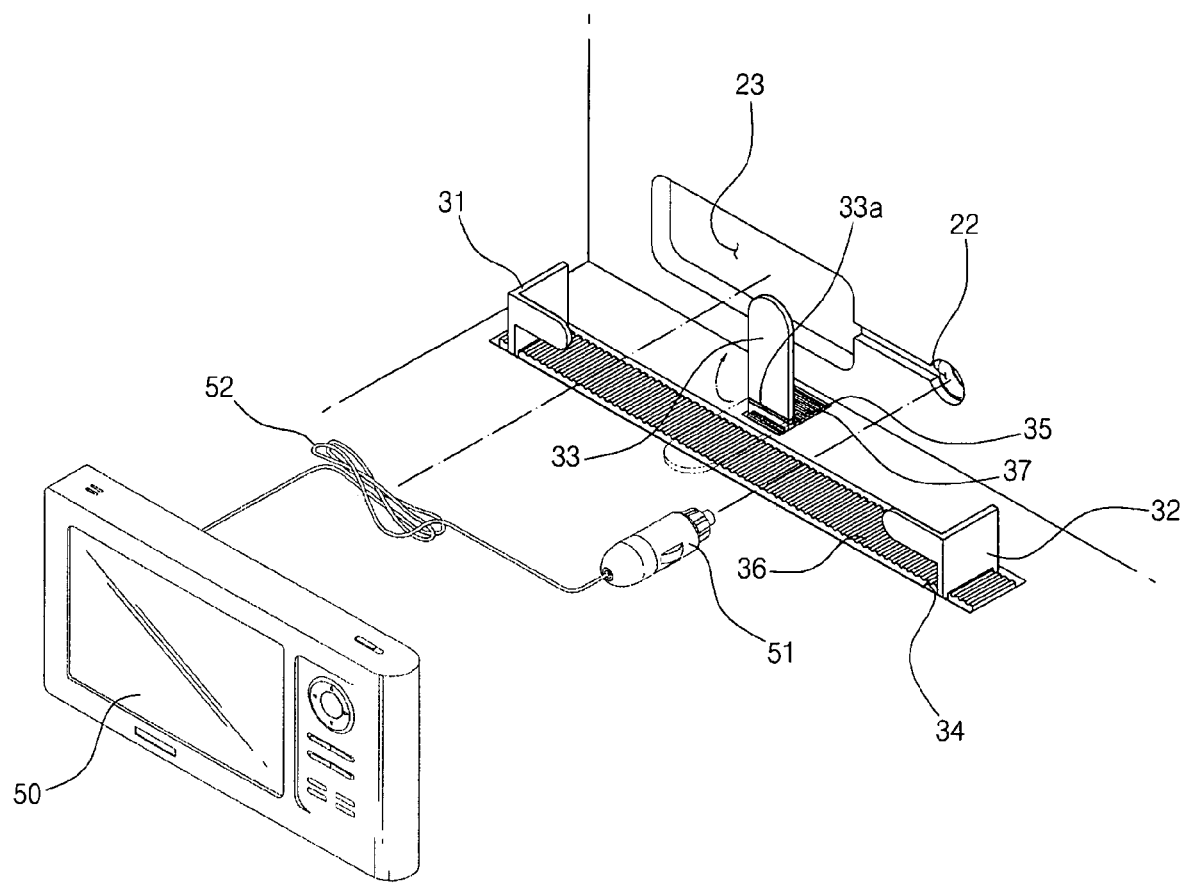
FIG. 4 is a schematic view illustrating a space part of a dashboard of FIG. 1.

The preferred embodiments of the present invention will be described with reference to the accompanying drawings. FIG. 1 is a perspective view illustrating a dashboard for mounting a portable terminal on its front side according to an embodiment of the present invention. FIG. 2 is a view illustrating a state before a portable terminal is mounted on a dashboard of FIG. 1. FIG. 3 is a view illustrating a state after a portable terminal is used in a dashboard of FIG. 1. FIG. 4 is a schematic view illustrating a space part of a dashboard of FIG. 1.

In a vehicle dashboard, the dashboard 10a equipped with a receiving structure for a portable terminal according to an embodiment of the present invention comprises a space part 20 for mounting a terminal 50 with an opening 21 being formed at its one side, and a support part 30 which is formed in the interior of the space part 20 for supporting the terminal.

Here, a cover part 40 may be further provided for opening and closing the opening 21 of the space part 20.

The opening 21 is formed at a front side of the space part 20, and the portable terminal 50 is placed in the opening 21. More preferably, the lower side of the portable terminal 50 is mounted on the bottom of the space part 20.

On one side of the space part 20, there are provided a connection terminal 22 for an engagement with a power supply jack 51 of a terminal 50, and an electric line receiving groove 23 for arranging the electric lines such as a power cord 52 of the terminal 50. So, the electric lines are stored in the electric line receipt groove 23 for covering the same from the outside. Here, the connection terminal 22 and the electric line receipt groove 23 are preferably formed behind the portable terminal 50, namely, on a backside of the space part 20.

When a vehicle runs in a state that the portable terminal 50 is mounted on the bottom of the space part 20, the terminal 50 may move or fall down, which leads to an operation failure or damage, as the vehicle runs on curved roads, or accelerates or decelerates.

So, it is needed to stably support the terminal 50, so that it does not move or falls down when the vehicle runs. A "L" shaped first side support part 31 and a "L" shaped second side support part 32 are installed at both sides of a front lower side of the terminal 50 for thereby stably supporting the front and lateral sides of the terminal 50. It should be appreciated that a backside support part 33 is preferably formed on a backside of the terminal 50 for thereby stably supporting the backside of the terminal 50. Not shown in the drawings, the backside support part 33 may be formed as the wall body forming the space part 20 supports the backside of the terminal 50.

The first and second side support parts 31 and 32 and the backside support part 33 are preferably made of wooden, synthetic resin or a metallic material such as aluminum or stainless steel. More preferably it is made of a synthetic resin material.

Since the widths and thickness of the terminal 50 are various depending on the kinds of the portable terminal 50, it is sometimes needed to adjust the position of the support part 30 depending on the width and thickness of the terminal 50 to be used.

For the above purposes, a transverse guide groove 34 may be formed in a transverse direction on the bottom of the space part 20, and a lengthwise guide groove 35 may be formed in the lengthwise direction. Here, the first and second side support parts 31 and 32 move along the transverse guide groove 34 in left and right directions depending on the width of the terminal 50, and the backside support part 33 moves along the lengthwise guide groove 35 in forward and backward directions depending on the thickness of the terminal 50.

A beam shaped transverse guide rail 36 and a beam shaped lengthwise guide rail 37 each having a curved surface, preferably a prominence and depression structure surface on their upper sides are inserted into the transverse and lengthwise direction guide grooves 34 and 35, respectively. The transverse and lengthwise direction guide rails 36 and 37 pass through the lower sides of the support parts 31 through 33, respectively, and when the support parts 31 through 33 move along the transverse and lengthwise direction guide rails 36 and 37, the lower sides of the support parts 31 through 33 are caught by means of the curved surface, preferably a prominence and depression structure surface of the transverse and lengthwise direction guide rails 36 and 37, respectively, so that a random movement of the portable terminal is substantially prevented.

It is preferred that a terminal supporting and/or holding portions of the side support parts 31 and 32 are movable up and down so as to effectively the various sizes of the portable terminals 50. Here, the supporting and/or holding portions may be positioned at the intermediate portion or the upper portion of the terminal 50 depending on the features of the terminal 50.

A hinge part 33a is formed at an intermediate portion of the backside support unit 33. When in use, it is made upright in the height direction of the terminal 50, and when not in use, it is folded in a forward direction, and the terminal 50 is laid down thereon. When the hinge part 33a is made upright after a rotation of 90° with respect to the bottom of the space part 20, its further rotation in a backward direction is stopped while supporting the backside of the terminal 50.

Figure 5:
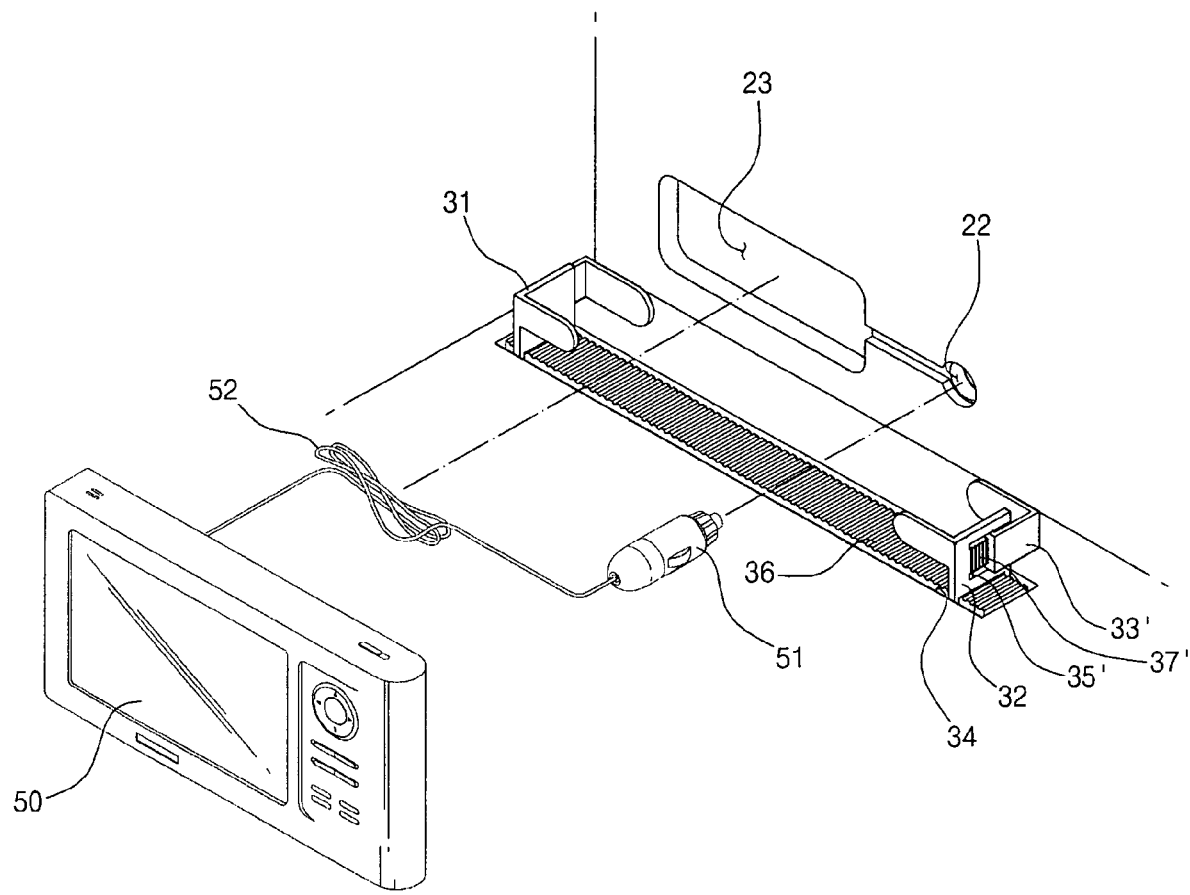
FIG. 5 is a schematic view illustrating another example of a space part of a dashboard of FIG. 1.

The backside support part 33' may be engaged to each side support part 31 and 32 with its width being adjustable, not engaged to the rear side of the space part. For example, as shown in FIG. 5, a horizontal direction groove 35' and a horizontal direction guide 37' are formed on the outer side surfaces of the side support parts 31 and 32, respectively. The backside support member 33' is engaged to the horizontal direction groove 35', so that the side support parts 31 and 32 and the backside support member 33' may be integrated. At this time, the backside support part 33' is formed in "L" shape like each side support part 31 and 32, but it should be opposite to each side support part 31 and 32 for substantially supporting the width sides of the terminal. So, the side support parts 31 and 32 and the backside support 33' are formed in a channel shape for thereby being adjustable depending on the width of the terminal.

Not shown in the drawings, the support part 30 may consist of a lateral support portion for supporting only one side between the left and right sides of the portable terminal 50, and the remaining side can be supported by means of the wall body of the space part 30. And then in case of the left and right side support parts 31 and 32 can closely support only the lateral sides, not the front and lateral side surfaces.

When the backside support part 33 is not provided or when the wall body, which forms the space part 20, becomes the backside support part 33, the terminal 50 supported by means of the side support parts 31 and 32 slide backward along with the support part 30, and the backside of the terminal 50 can be closely contacted and supported.

The cover 40 can be provided for opening and closing the opening 21. The cover 40 is preferably made of wood, synthetic resin or a certain metallic material such as aluminum or stainless steel, and more preferably it is made of a synthetic resin material.

When the cover 40 opens or closes the opening 21, all the opening and closing methods including a hinge type can be used. More preferably, a sliding door type may be applied for opening and closing the opening 21 as the front side of the cover 40 slides from one side to the other side of the opening 21 of the front side of the dashboard 10a. A handle 46 is provided at one side of the front side of the cover 40.

Here, the cover 40 is preferably formed of multiple board pieces, so the cover 40 can naturally slide along the curved portion even when the opening 21 is formed in a curved shape.

Not shown in the drawings, the cover part 40 may be opened and closed in the forward or backward direction or the upward or downward direction with the help of a motored force or may be rotated by means of an elastic force in a hinge shaft by one touch type and be opened upward or downward, or leftward or rightward. Here, various types and shapes can be adapted.

In addition, if necessary, the cover part may be not provided.

The operation and use of the dashboard 10a having a receiving structure for a portable terminal according to an embodiment of the present invention will be described. Not described in the earlier descriptions, even when the cover part 40 is not provided, those who skilled in the art can substantially understand by adapting the following descriptions.

In a state that the space part 20 formed in a front dashboard of a user is closed by means of the cover 40, the user grips the handle 46 of the cover 40 and pushes up the same for thereby opening the opening 21 of the space part 20.

The power supply jack 51 of the terminal 50 is engaged to the connection terminal 22 provided at the rear side of the space part 20, and the power cord 52 is stored in the electric line receipt groove 23 for cleaning the electric lines.

The lower side of the portable terminal 50 is mounted on the bottom of the space part 20, and the first and second side support parts 31 and 32 are moved in right and left directions on the transverse guide rail 36 depending on the width of the terminal 50 for stably supporting both lower sides of the terminal 50, so it is possible to prevent the movements of the terminal 50 in left and right directions. At this time, since the first and second side support parts 31 and 32 are formed of angle shaped pieces, the front lower side of the terminal 50 can be substantially supported by the first and second side support parts 31 and 32.

The backside support part 33 is moved in forward and backward directions on the lengthwise guide rail 37 depending on the thickness of the terminal 50 for thereby substantially supporting the lower backside of the terminal 50. Since the front side of the terminal 50 is stably supported by means of the first and second side support parts 31 and 32, the forward and backward movements of the terminal 50 can be supported, so that the terminal 50 can be ready for use.

The power supply jack 51 of the terminal 50 is removed from the connection terminal 22 after the use of the terminal, and the first and second side support parts 31 and 32 are moved in both directions, and the portable terminal 50 is removed from the space part 20, and the backside support part 33 is folded in forward direction, and the terminal 50 is laid down, and then the cover 40 is covered for thereby closing the opening 21.

Figure 6:
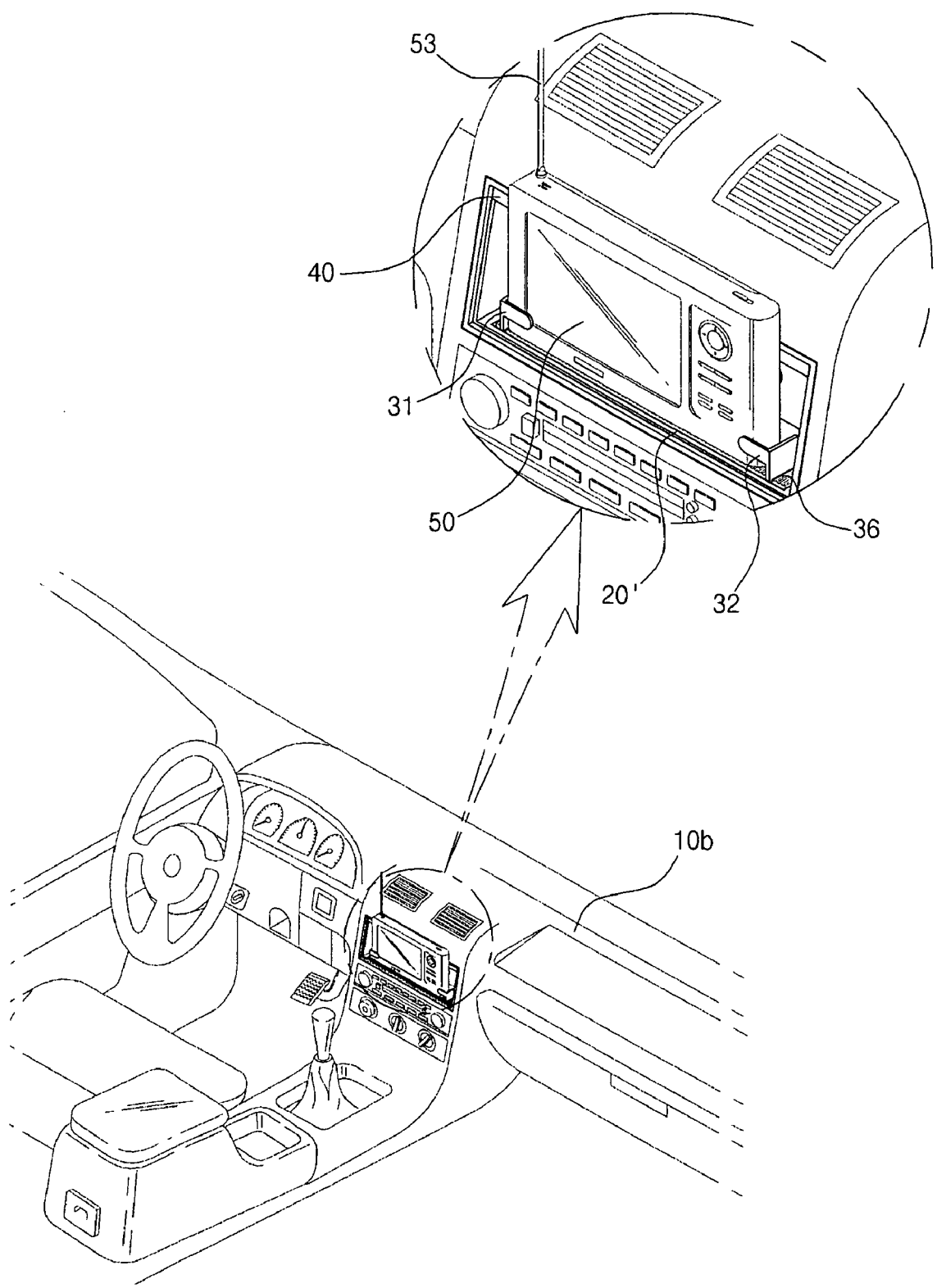
FIG. 6 is a view illustrating a state that a portable terminal is closely mounted on a dashboard according to another embodiment of the present invention.

FIG. 6 is a view illustrating a state that a portable terminal is closely mounted on a dashboard. Here, the same reference numerals mean the same elements having the same operations.

The dashboard 10b having a receiving structure for a portable terminal according to another embodiment of the present invention is similar with the embodiment of FIG. 1 except that the bottom plate 20' of the space part 20 including the lower side of the portable terminal and the portion for mounting the first and second side support parts 31 and 32 slide backward, so the backside of the portable terminal closely contacts with the dashboard.

In addition, the bottom plate 20' of the space part 20 including the lower side of the portable terminal and the portion for mounting the first and second side support parts 31 and 32 slides backward, so the backside of the portable terminal can be supported by means of the backside support part 33.

The dashboard 10b having a receiving structure for a portable terminal according to the present invention is similar with the first embodiment of the present invention except that the opening 21 may have a curved surface along the curved shape of the dashboard 10b, and the antenna 53 can be easily extended from the engaged portable terminal 50.

Figure 7:
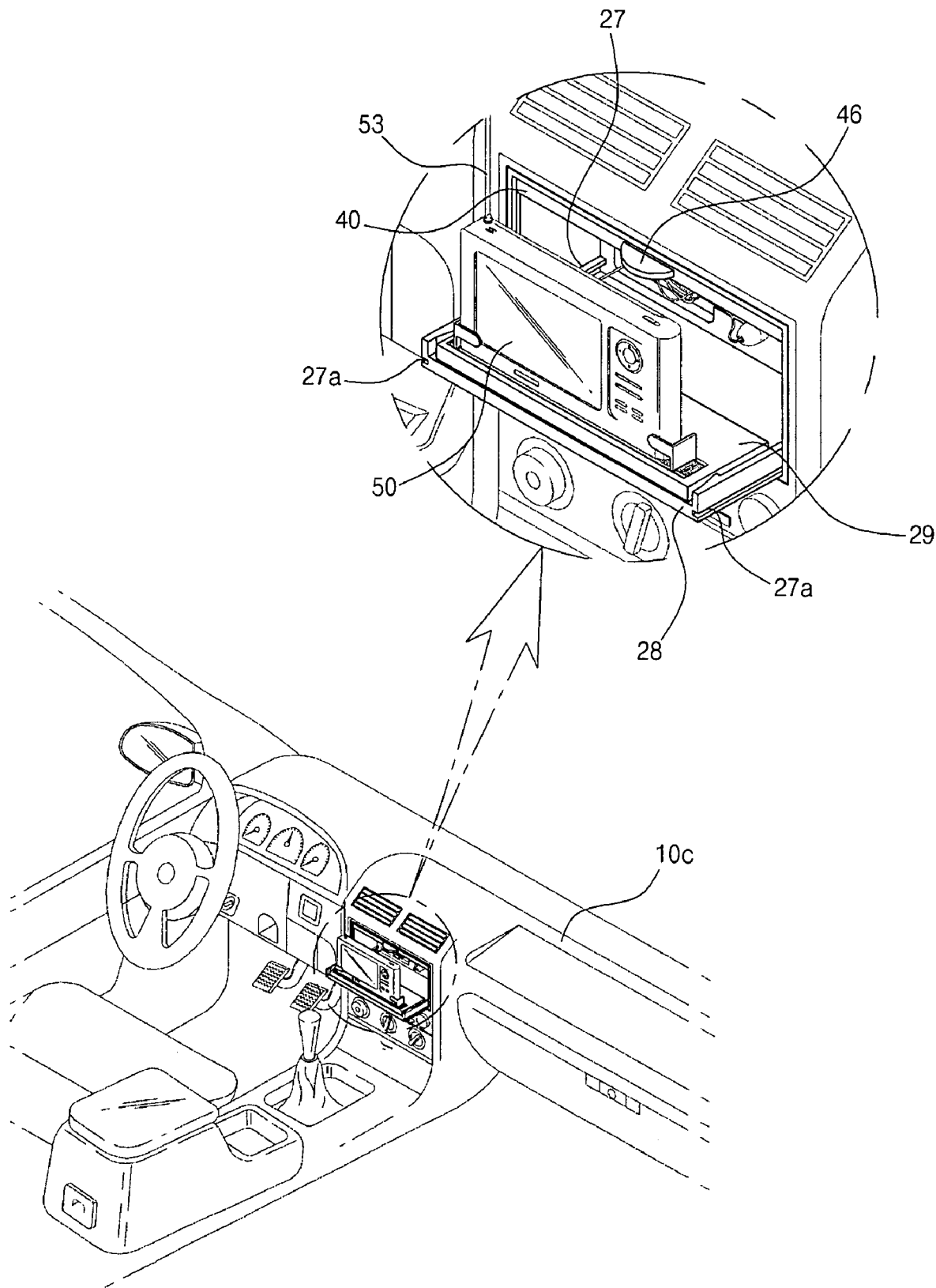
FIG. 7 is a view illustrating a state that a base plate slides from a space part of a dashboard according to another embodiment of the present invention.
Figure 8:
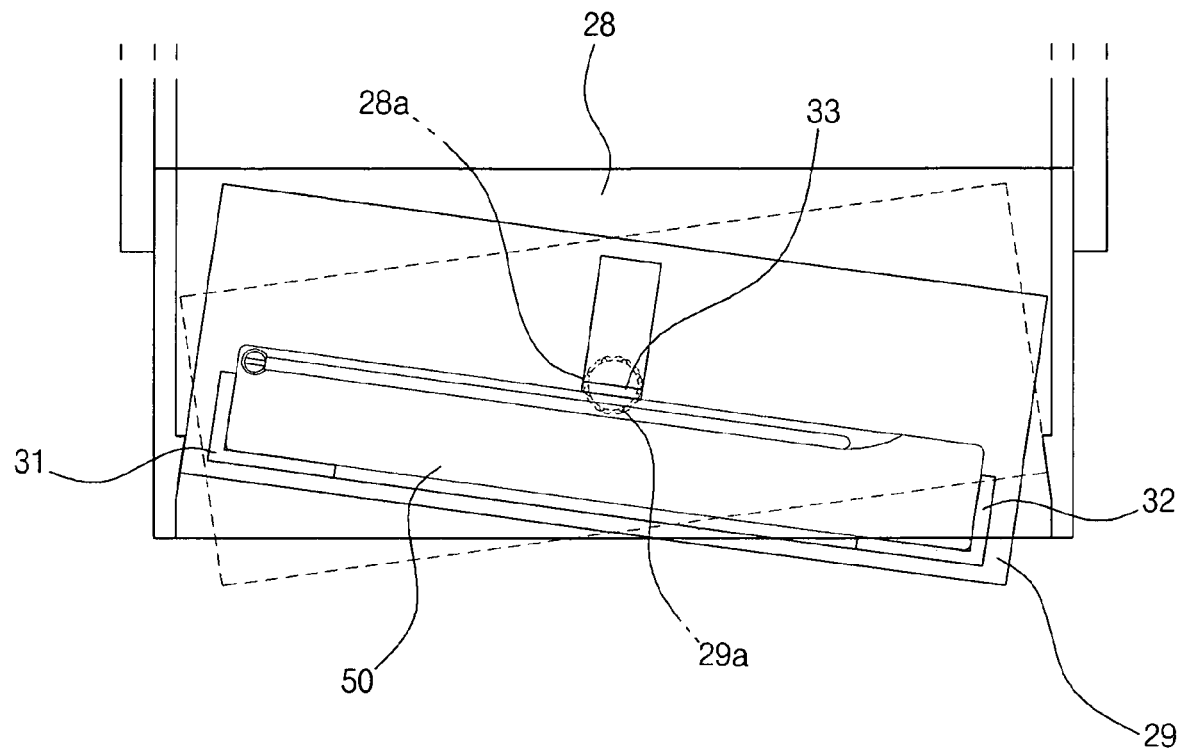
FIG. 8 is a view illustrating a state that a rotation plate rotates with respect to a base plate of FIG. 7.

FIG. 7 is a view of another embodiment of the present invention while showing a state that a base plate is slid out from a space part of a dashboard, and FIG. 8 is a view illustrating a state that a rotation plate rotates with respect to the base plate of FIG. 7. Here, the same reference numerals mean the same elements having the same functions.

The dashboard having a receiving structure for a portable terminal according to another embodiment of the present invention is similar with the embodiment of FIG. 1 except that there are further provided slide bars 27 formed at both sides of the space part 20, a base plate 28 in which guide grooves 27a for inserting the slide bars 27 therein are formed at both sides of the same, and a rotation plate 29 which is engaged to an upper side of the base plate 28 and mounts a lower side of the portable terminal 50 thereon. Here, the transverse guide groove 34 and the lengthwise guide groove 35 are formed on the upper surface of the rotation plate 29.

A tooth shaped rotation groove 28a is formed on an upper surface of the base plate 28, and a rotation part 29a engaged to the rotation groove 28a is extended and formed on the lower surface of the rotation plate 29. As the rotation part 29a of the rotation plate 29 is engaged to the rotation groove 28a of the base plate 28, the rotation plate 29 rotates at a certain tiled angle with respect to the base plate 28.

So, the user pushes up the cover 40 and opens the opening 21, and the base plate 28 slides forward from the space part 20 and is protruded from the front side of the dashboard 10c. The rotation plate 29 is rotated at a certain angle for an easier use of the portable terminal 50. In this case, it is easy to extend the antenna from the engaged portable terminal 50.

The base plate 28 is slid into the space part 20 after the use of the terminal 50, and the opening 21 is closed.

Figure 9:
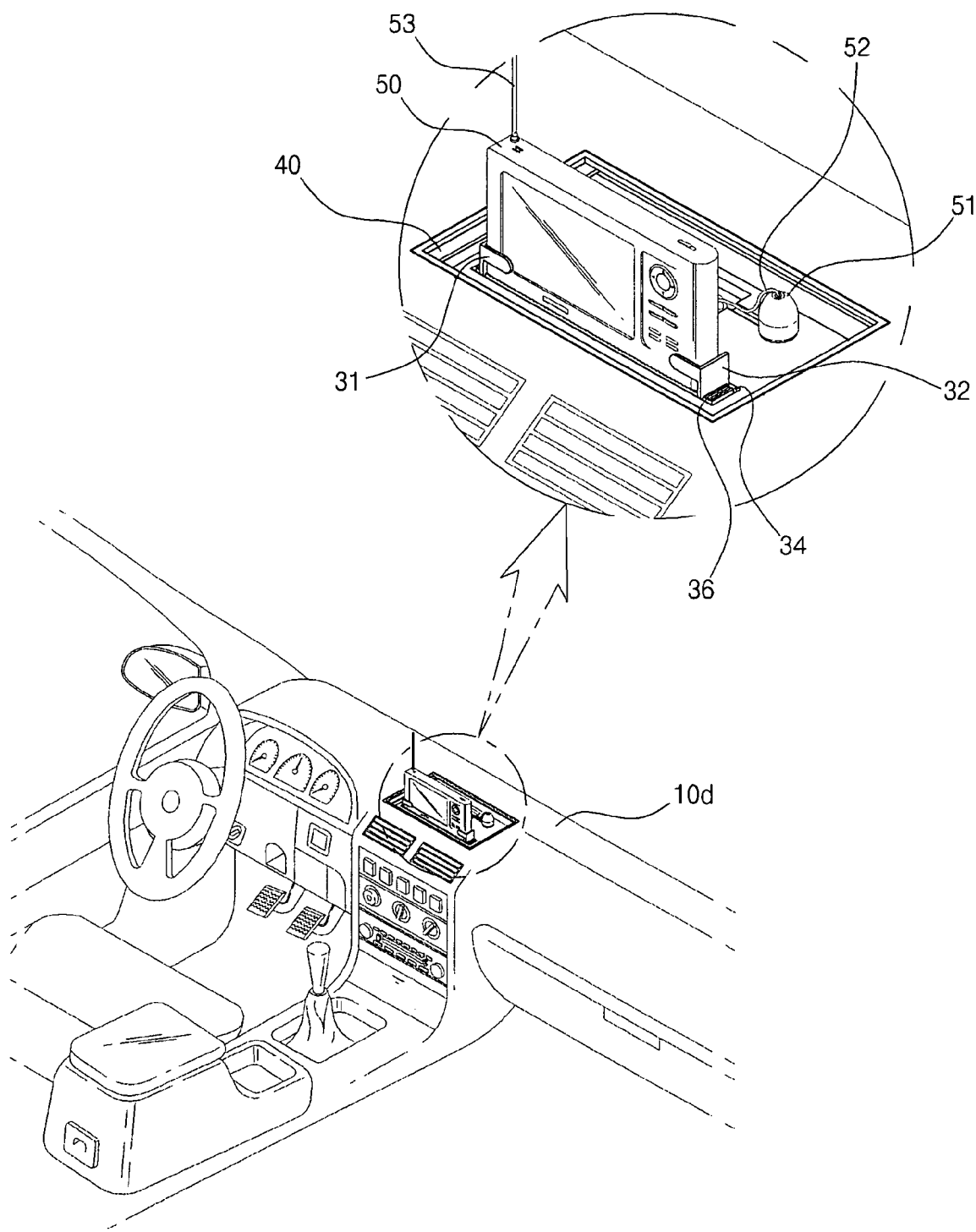
FIG. 9 is a perspective view illustrating a dashboard for mounting a portable terminal on its upper surface according to another embodiment of the present invention.
Figure 10:
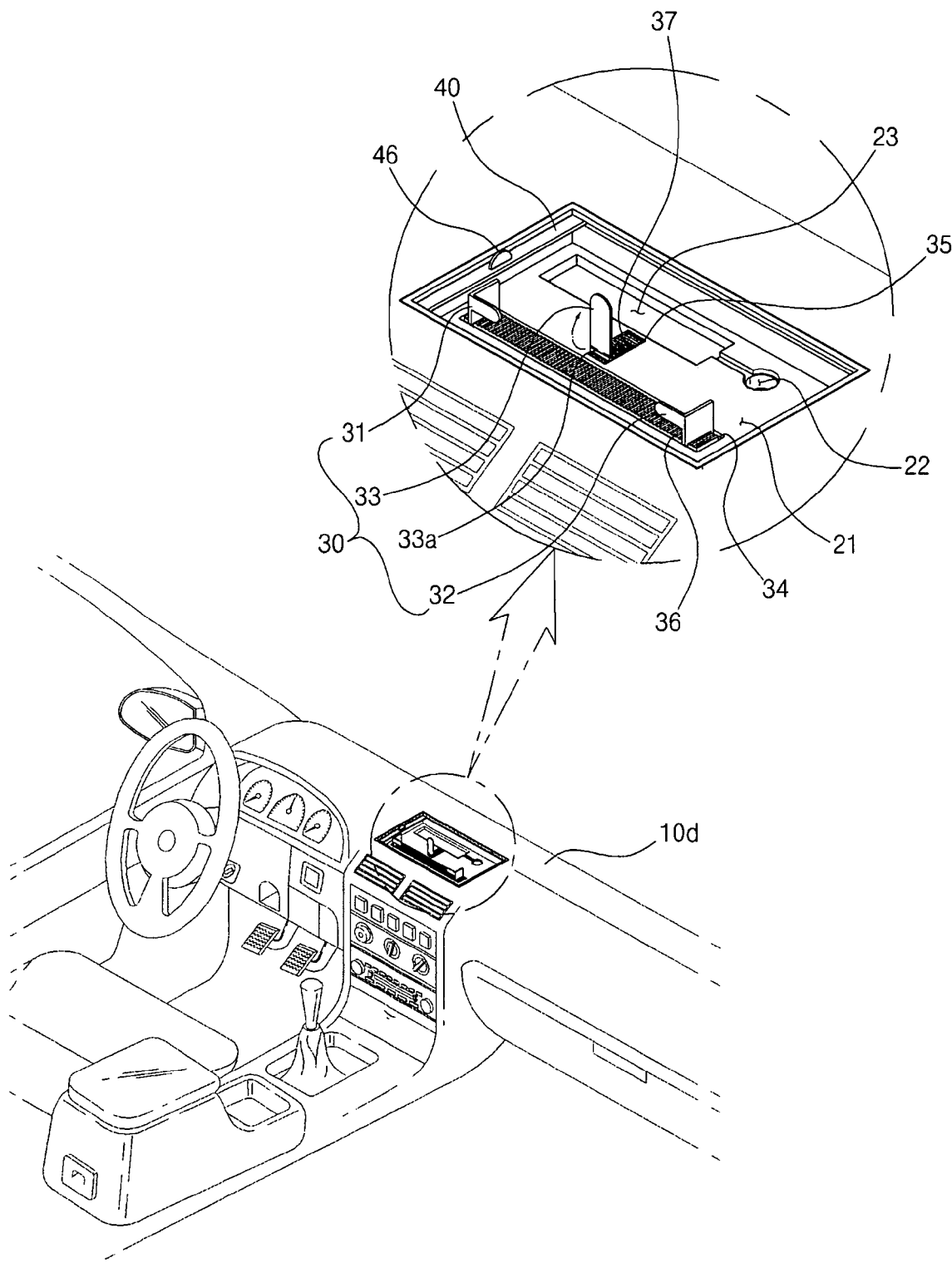
FIG. 10 is a view illustrating a state before a portable terminal is mounted on a dashboard of FIG. 9.
Figure 11:
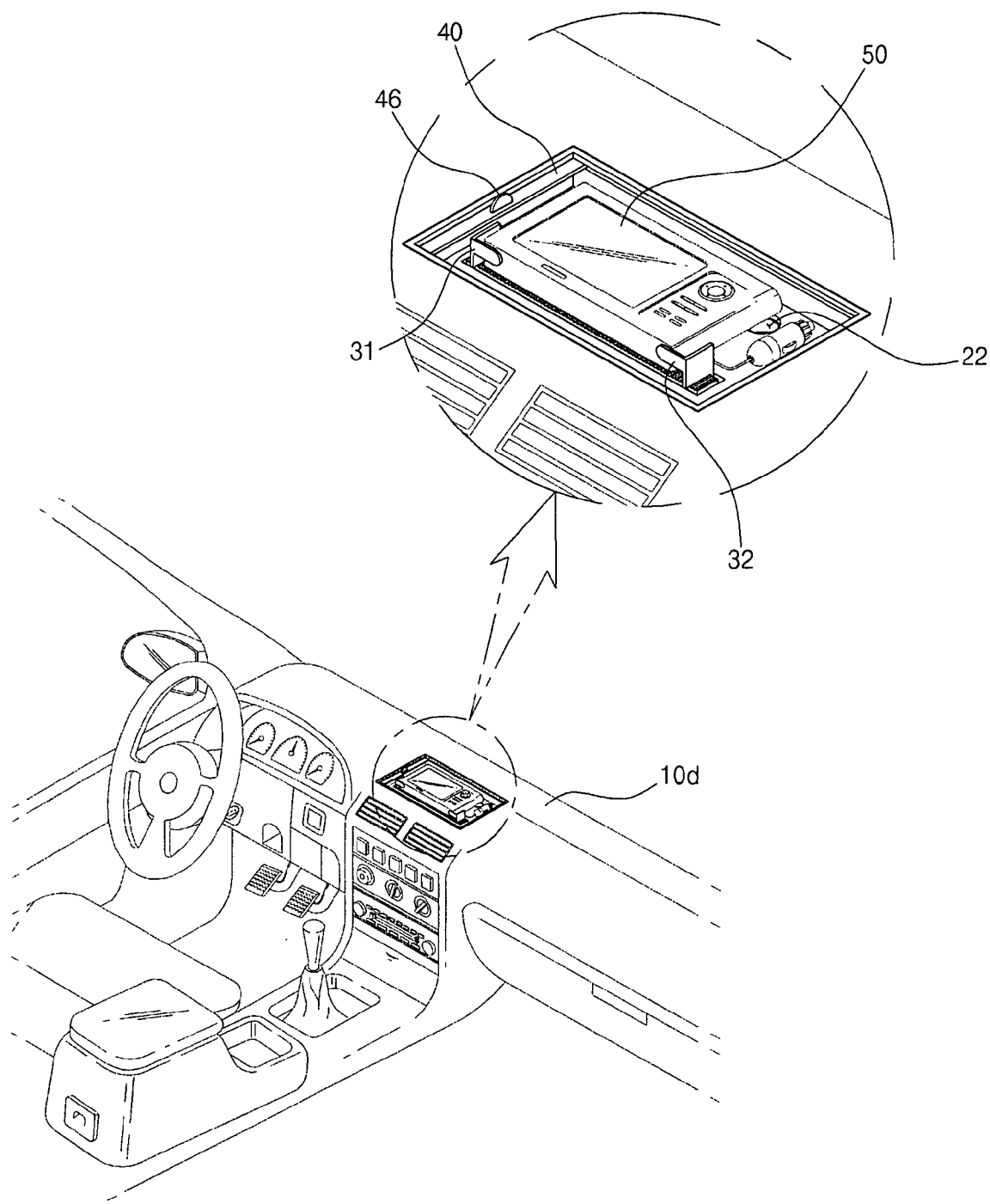
FIG. 11 is a view illustrating a state that a portable terminal is laid down in a dashboard of FIG. 9.
Figure 12:
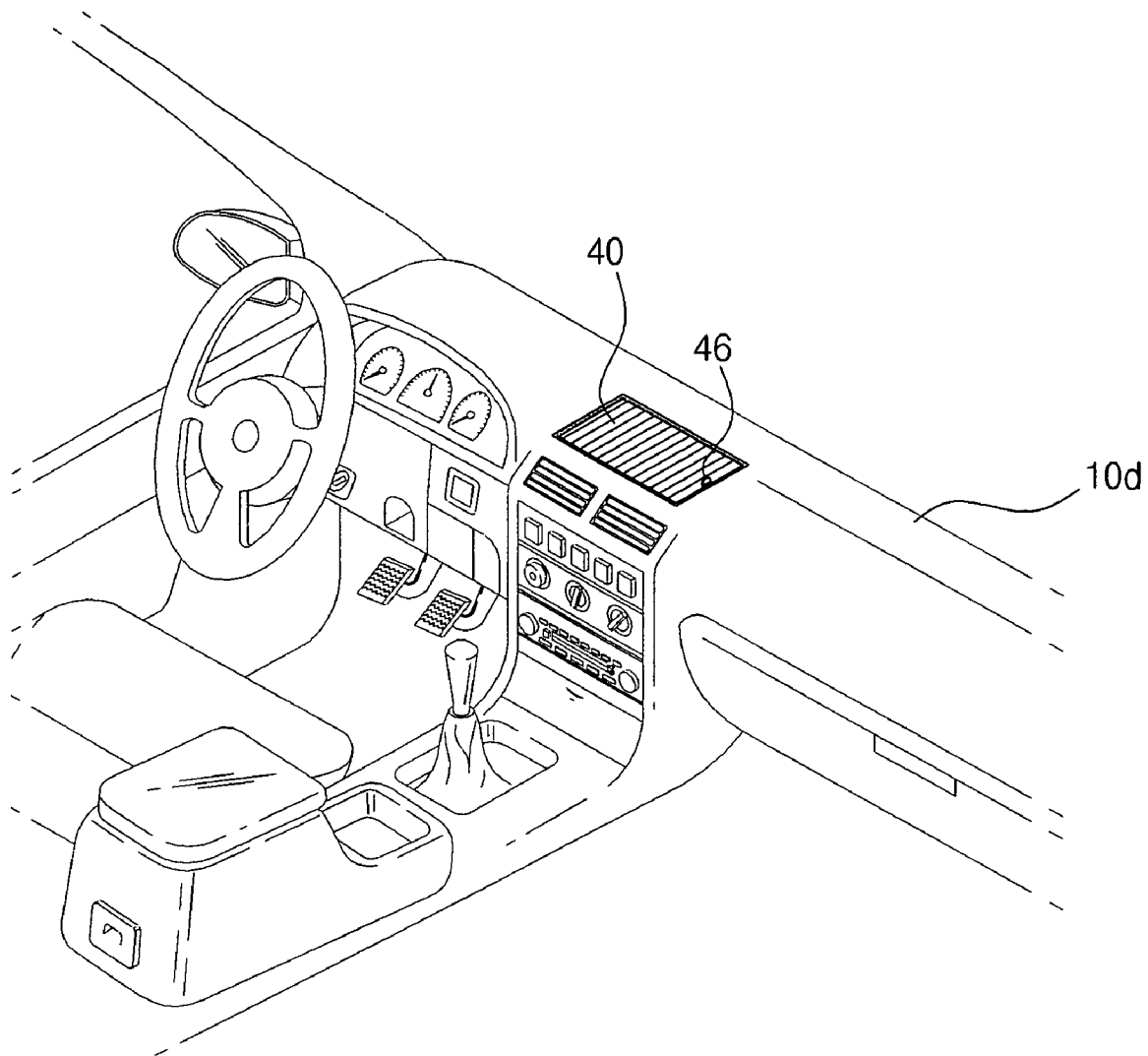
FIG. 12 is a view illustrating a state after a portable terminal is used on a dashboard of FIG. 9.

FIG. 9 is a perspective view illustrating a dashboard in which a portable terminal is engaged at its upper surface according to another embodiment of the present invention, and FIG. 10 is a view before a portable terminal is mounted on the dashboard of FIG. 9, and FIG. 11 is a view illustrating a state that a portable terminal is laid down and stored in the dashboard of FIG. 9, and FIG. 12 is a view after the portable terminal is used in the dashboard of FIG. 9. The reference numerals mean the same elements having the same functions.

The dashboard having a receiving structure for a portable terminal according to another embodiment of the present invention is similar with the embodiment of FIG. 1 except that a space part 20 is formed on an upper dashboard of a vehicle, and a connection terminal 22 and a line receipt groove 23 are formed on the bottom of the space part 20, and an opening is formed on an upper side of the space part 20.

When the terminal 50 is mounted on the bottom of the space part 20, the portable terminal 50 is protruded from the upper side of the opening 21, and the front side of the terminal 50 is exposed to the user's side. So, the antenna 53 can be easily extended from the engaged portable terminal 50, and the opening 21 is opened and closed as the cover 40 slides in left and right directions.

Accordingly, as described above, in a dashboard having a receiving structure for a portable terminal according to the present invention, a portable terminal having a multimedia function such as a vehicle navigation function, a 3D image playback function, a music playback function, etc. can be easily engaged on a dashboard or disengaged from the same. In an embodiment including a cover, when not using a portable terminal, the cover is closed, so an outer appearance looks good, and it is possible to prevent robbery.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A receiving structure of a vehicle dashboard for a portable terminal, the receiving structure defining a space for mounting the portable terminal and an opening on one side, the receiving structure comprising a support part provided inside the space for supporting the terminal and preventing movements of the terminal;

wherein said support part includes first and second side support parts for supporting front and both lateral sides of the terminal, wherein the receiving structure further comprises a bottom plate slidable in a rearward direction, the bottom plate including portions for mounting a lower side of the portable terminal and the first and second side support parts, and wherein the backside of the portable terminal is supported by means of the dashboard or the wall body of the space part.

2. A receiving structure of a vehicle dashboard for a portable terminal, the receiving structure defining a space for mounting the portable terminal and an opening on one side, the receiving structure comprising a support part provided inside the space for supporting the terminal and preventing movements of the terminal;

wherein said support part includes first and second side support parts for supporting front and both lateral sides of the terminal, and a backside support part for supporting a backside of the terminal, wherein the receiving structure further comprises a bottom part slidable in a rearward direction, the bottom part including portions for mounting a lower side of the portable terminal and the first and second side support parts, and wherein the backside of the portable terminal is supported by means of the backside support part.

3. A receiving structure of a vehicle dashboard for a portable terminal, the receiving structure defining a space for mounting the portable terminal and an opening on one side, the receiving structure comprising a support part provided inside the space for supporting the terminal and preventing movements of the terminal, and a cover for opening or closing the opening;
   wherein said support part includes first and second side support parts for supporting the front and both lateral sides of the terminal;
   wherein the receiving structure further comprises a bottom plate slidable in a rearward direction, the bottom plate including portions for mounting a lower side of the portable terminal and the first and second side support parts, and
   wherein the backside of the portable terminal is supported by means of the dashboard or the wall body of the space part.

4. A receiving structure of a vehicle dashboard for a portable terminal, the receiving structure defining a space for mounting the portable terminal and an opening on one side, the receiving structure comprising a support part provided inside the space for supporting the terminal and preventing movements of the terminal, and a cover for opening or closing the opening;
   wherein said support part includes first and second side support parts for supporting the front and both lateral sides of the terminal, and a backside support part for supporting a backside of the terminal;
   wherein the receiving structure further comprises a bottom plate slidable in a rearward direction, the bottom plate including portions for mounting a lower side of the portable terminal and the first and second side support parts.

5. A receiving structure of a vehicle dashboard for a portable terminal, the receiving structure defining a space for mounting the portable terminal and an opening on one side, the receiving structure comprising:
   a support part provided inside the space for supporting the terminal and preventing movements of the terminal,
   a cover for opening or closing the opening;
   slide bars formed at both sides of the space;
   a base plate having guide grooves at both sides thereof for receiving the slide bars, respectively, therein and a tooth shaped rotation groove on an upper surface; and
   a rotation plate in which a rotation part corresponding to the rotation groove is extended from a lower surface downwardly, with a lower side of the portable terminal being mountable on the rotation plate.

6. A receiving structure of a vehicle dashboard for a portable terminal, the receiving structure defining a space for mounting the portable terminal and an opening on one side, the receiving structure comprising a support part provided inside the space for supporting the to terminal and a preventing movements of the terminal, and a cover for opening or closing the opening;
   wherein said support part includes first and second side support parts for supporting the front and both lateral sides of the terminal;
   wherein said first and second side support parts are movable in the left and right directions, namely, in the widthwise direction of the terminal along a transverse guide groove formed on a bottom on which the portable terminal can be mounted.

7. The receiving structure of claim 6, wherein a transverse guide rail having a prominence and depression structure on an upper side is inserted into the transverse guide groove.

8. A receiving structure of a vehicle dashboard for a portable terminal, the receiving structure defining a space for mounting the portable terminal and an opening on one side, the receiving structure comprising a support part provided inside the space for supporting the terminal and preventing movements of the terminal, and a cover for opening or closing the opening;
   wherein said support part includes first and second side support parts for supporting the front and both lateral sides of the terminal, and a backside support part for supporting a backside of the terminal;
   wherein said backside support part is movable in forward and backward directions, namely, in a thickness direction of the terminal along a lengthwise guide groove formed in a bottom on which the portable terminal can be mounted.

9. The receiving structure of claim 8, wherein a lengthwise guide rail having a prominence and depression structure on an upper side is inserted into the lengthwise guide groove.

10. The receiving structure of claim 8, wherein said backside support part has a hinge connection structure at an intermediate portion such that the backside support part can be folded when not in use.

11. A receiving structure of a vehicle dashboard for a portable terminal, the receiving structure defining a space for mounting the portable terminal and an opening on one side, the receiving structure comprising a support part provided inside the space for supporting the terminal and preventing movements of the terminal, and a cover for opening or closing the opening;
   wherein said support part includes first and second side support parts for supporting the front and both lateral sides of the terminal;
   wherein a horizontal guide groove and a horizontal direction guide rail having a prominence and depression structure surface are formed on outer side surfaces of the first and second side supports, and a backside support member is integrally engaged to the horizontal guide groove such that a width can be adjusted with respect to the side support parts, respectively.

12. A vehicle dashboard comprising the receiving structure of claim 1 and a portable terminal mounted on the receiving structure.

13. A vehicle dashboard comprising the receiving structure of claim 2 and a portable terminal mounted on the receiving structure.

14. A vehicle dashboard comprising the receiving structure of claim 3 and a portable terminal mounted on the receiving structure.

15. A vehicle dashboard comprising the receiving structure of claim 4 and a portable terminal mounted on the receiving structure.

16. A vehicle dashboard comprising the receiving structure of claim 5 and a portable terminal mounted on the receiving structure.

17. A vehicle dashboard comprising the receiving structure of claim 6 and a portable terminal mounted on the receiving structure.

18. A vehicle dashboard comprising the receiving structure of claim 7 and a portable terminal mounted on the receiving structure.

19. A vehicle dashboard comprising the receiving structure of claim 8 and a portable terminal mounted on the receiving structure.

* * * * *